UNITED STATES PATENT OFFICE.

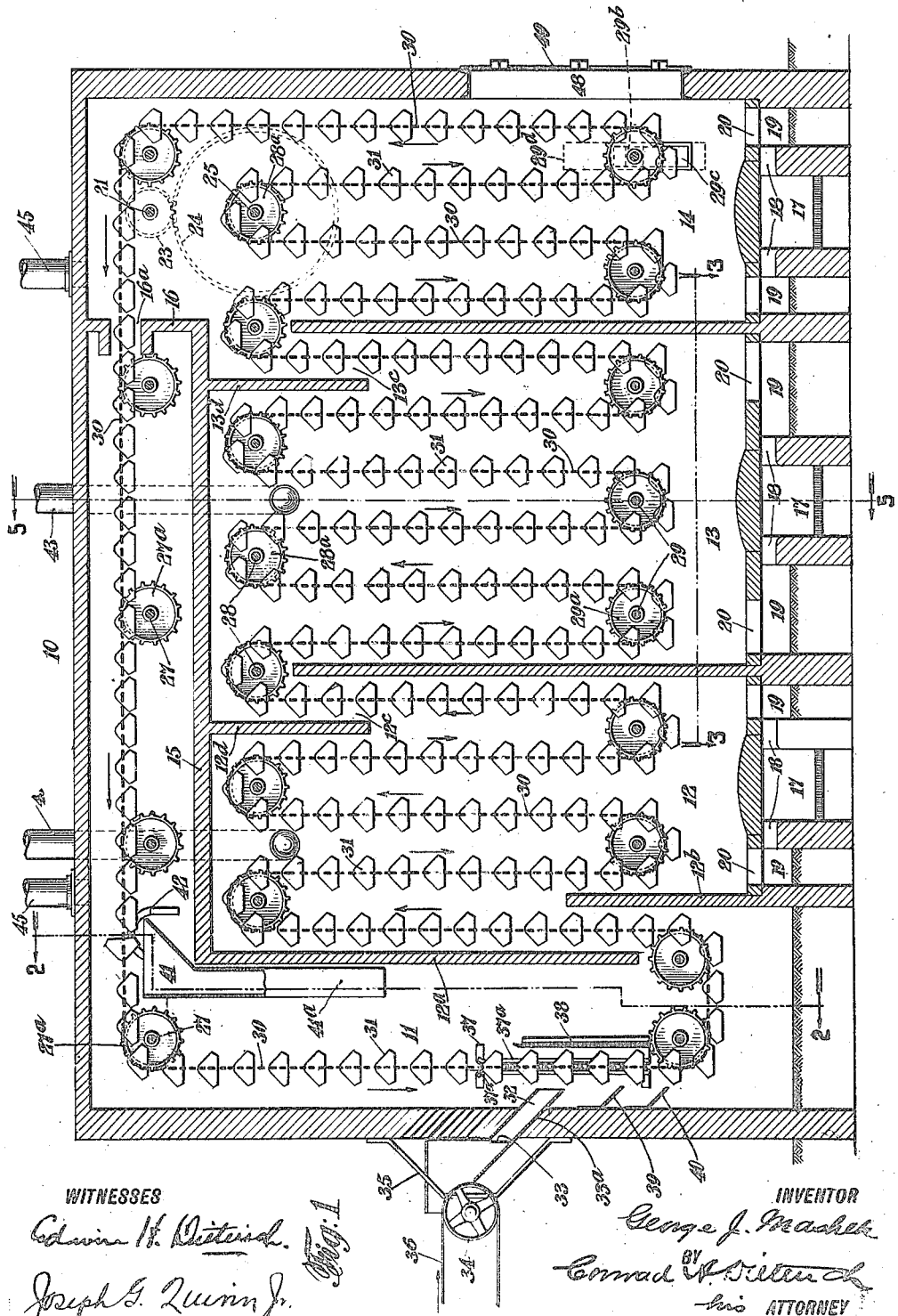

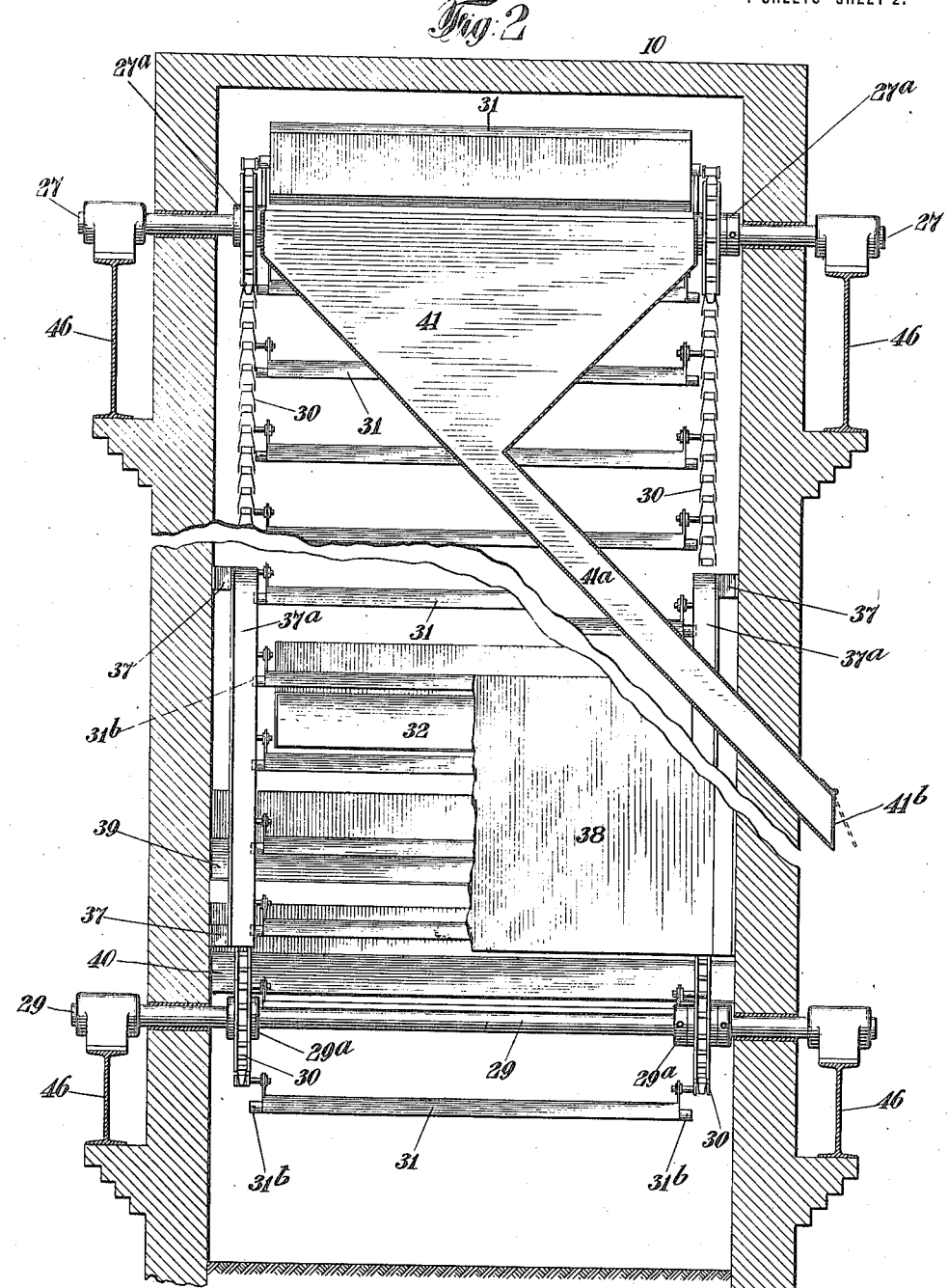

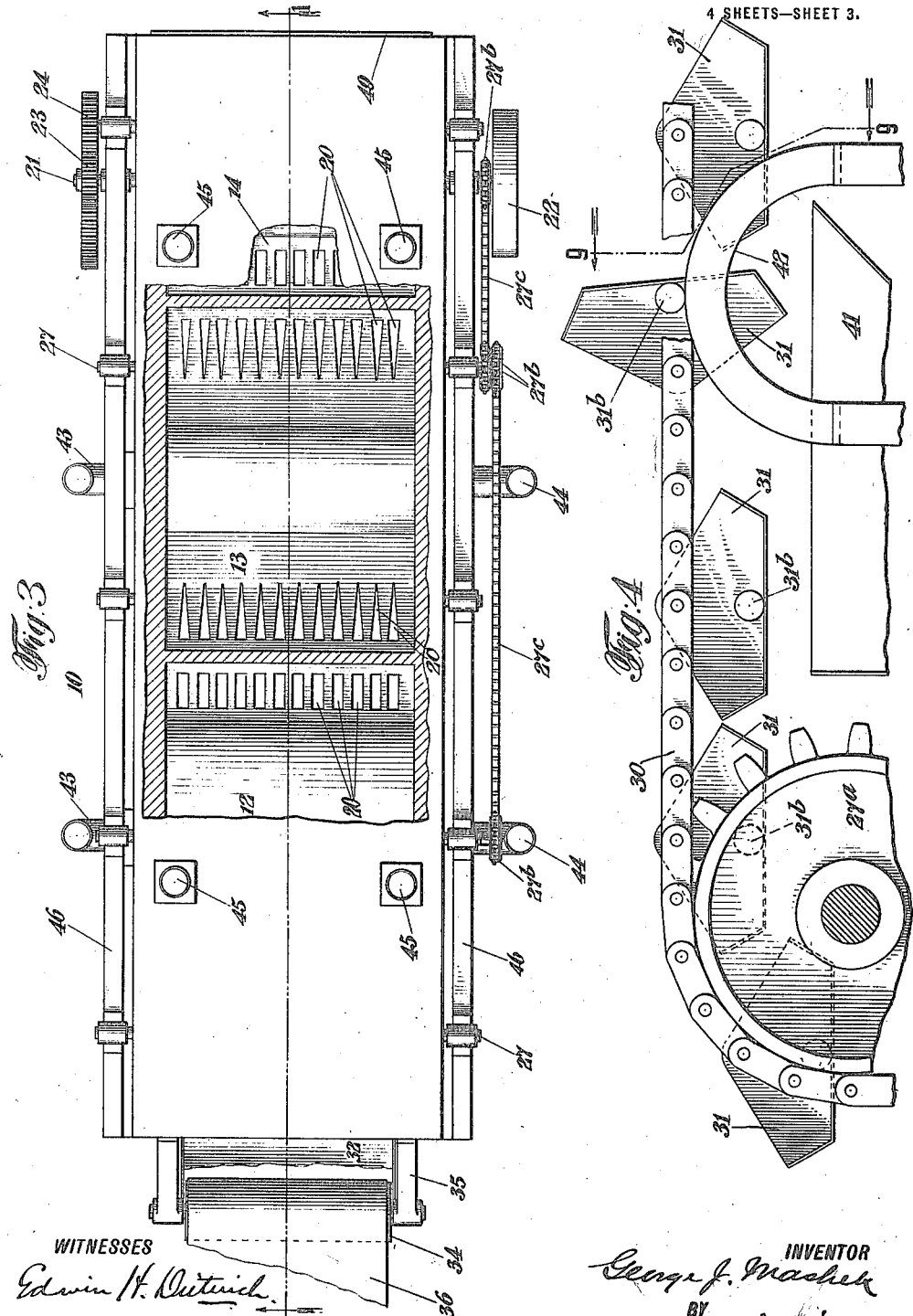

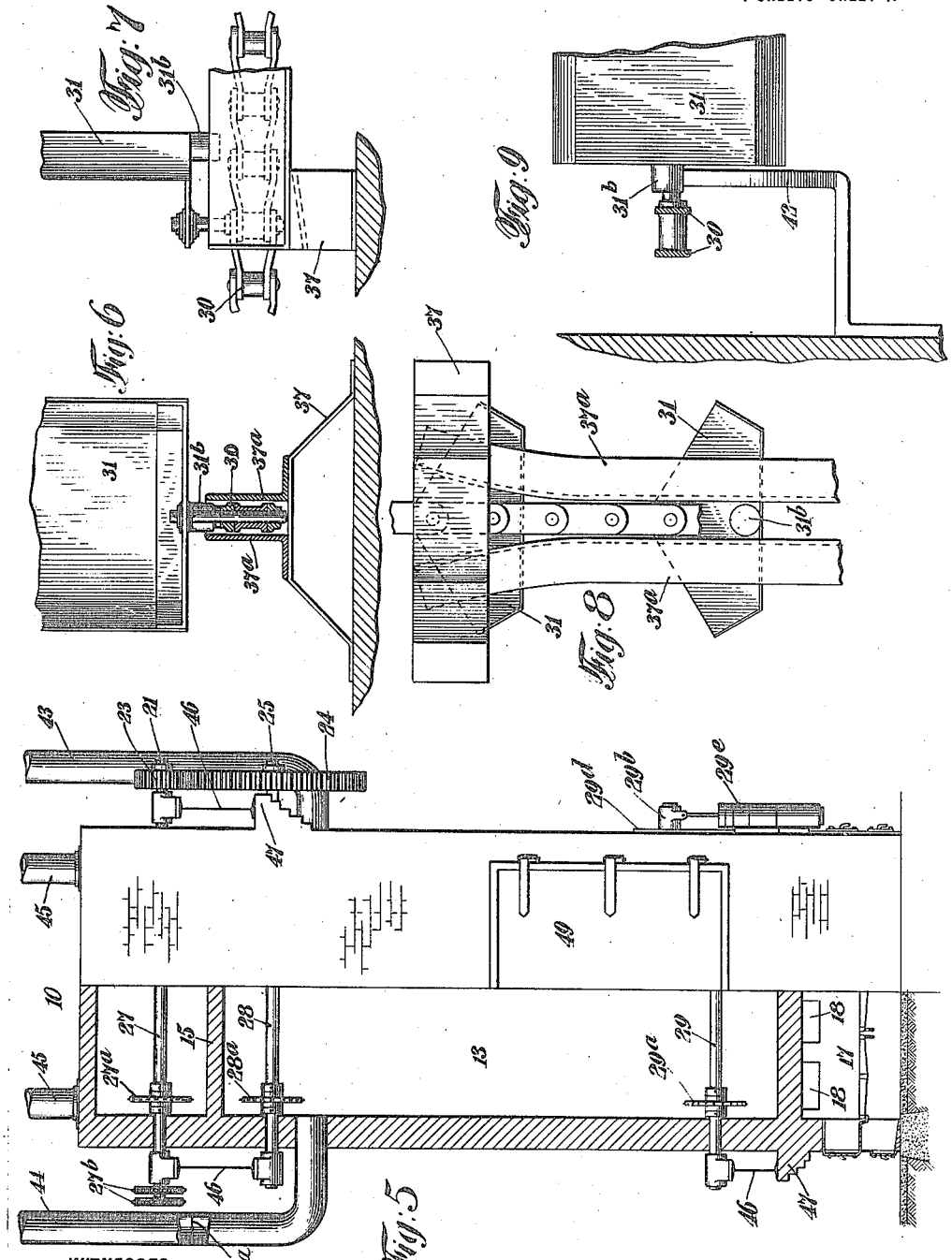

GEORGE J. MASHEK, OF NEWARK, NEW JERSEY.

DRYING AND BAKING OVEN.

1,157,658. Specification of Letters Patent. Patented Oct. 19, 1915.

Application filed December 19, 1912. Serial No. 737,611.

*To all whom it may concern:*

Be it known that I, GEORGE J. MASHEK, a citizen of the United States, residing in Newark, Essex county, in the State of New Jersey, have invented certain new and useful Improvements in Drying and Baking Ovens, of which the following is a full, clear, and exact specification.

My invention relates to improvements in drying and baking apparatus, and the same has for its object more particularly to provide a drying and baking oven of the continuous feed and discharge type in which the supports or receptacles for the material to be treated are maintained in unchanging position relative to the conveyer from the time they receive the material to be treated until they discharge the same.

Further said invention has for its object to provide an oven in which the material disposed upon or in said supports or receptacles is not moved or disturbed from the time the said supports or receptacles are loaded until the same are discharged.

Further said invention has for its object to provide an oven in which the supports or receptacles containing the material to be treated may be conducted through a plurality of chambers in which different temperatures may be maintained.

To the attainment of the aforesaid objects and ends my invention consists in the successive steps constituting my method and in the novel details of construction in operation, connection and arrangement of parts hereinafter more fully described and then pointed out in the claims.

In the accompanying drawings forming part of this specification wherein like numerals of reference indicate like parts—Figure 1 is a central longitudinal section showing one form of drying and baking oven constructed according to, and embodying my said invention; Fig. 2 is a transverse section taken on the line 2—2 of Fig. 1; Fig. 3 is a top view partly broken out showing a part of the furnaces; Fig. 4 is an enlarged detail side view showing a portion of the endless conveyer, and buckets thereon, and the means for tripping said buckets; Fig. 5 is a half-sectional end view taken on the line 1—1 of Fig. 3 showing the interior of one of the ovens; Figs. 6 and 7 are detail top and side views respectively showing the guides for holding the buckets in horizontal position for loading; Fig. 8 is a detail end view showing the means for holding the buckets against lateral movement during the loading operation, and Fig. 9 is an enlarged detail sectional view taken on the line 9—9 of Fig. 4.

In said drawings 10 designates the oven as a whole which is built of brick and of rectangular outline. The interior of said structure is divided transversely into four compartments 11, 12, 13, 14. The first of said compartments (11) constitutes the receiving and discharging chamber, and the remaining of said compartments (12, 13, 14) constitute the heating or baking chambers. When the oven is used for baking briquets, I preferably maintain temperatures of about 500°, 300°, and 250° respectively in said compartments.

15 denotes a longitudinal partition which extends across the top of the oven compartments 12, 13 and terminates in a vertical section 16 which is arranged directly above the wall separating the oven compartments 13, 14, and extends to the top of the oven 10. A transverse opening 16ª is provided in said vertical section 16 for the passage of the conveyer, and the ultimate discharge of the gases from the ovens.

The left hand wall of the oven compartment 12 has a longitudinal inlet opening at its lower end formed by making said wall in two sections 12ª, 12ᵇ, and arranging the same in vertical planes, one behind the other with the horizontal edges overlapping. The compartments 12, 13, are provided at the upper ends of their right hand walls with longitudinal outlet openings 12ᶜ, 13ᶜ, respectively, which are provided with baffle plates 12ᵈ, 13ᵈ, depending from the longitudinal partition 15 constituting the top of said oven compartments.

Within each of the oven compartments 12, 13, 14 is provided a furnace 17 which is preferably of the "closed top, muffled" type, in which the heat escapes through side openings 18, 18, into small combustion chambers 19, 19. From these small combustion chambers 19, 19 the heat is then diffused through openings 20, 20, arranged in the floors of the oven compartments, and caused to pass into said compartments. The openings 20, 20 are shown as of two different forms, depending upon the size of the chamber in the bottom of which they are located. The purpose hereof being to prevent the heat ascending in a particular spot, and thereby cause the buckets and iron work at that point to become overheated.

At the upper right hand end of the oven 10 is arranged a transverse driving shaft 21 which is mounted in suitable bearings, and has its opposite ends extending through the side walls of the oven. At the forward end of said shaft 21 is fixed a pulley 22 which is adapted for connection with a suitable source of power, and at the opposite end of said shaft 21 is fixed a pinion 23 which meshes with a large gear 24 fixed upon a shaft 25 suitably mounted directly below the shaft 21.

Upon the portion of the shaft 25 within the oven and adjacent to the opposite side walls thereof are fixed sprocket wheels $28^a$, $28^a$. Within the oven are arranged three horizontal rows of shafts 27, 28 and 29, which are provided adjacent to their opposite ends, but within the oven, with sprocket wheels $27^a$, $28^a$, $29^a$. The sprocket wheels $29^a$ are arranged directly below the centers of the intervals between the sprocket wheels $28^a$.

30, 30 denotes endless chain belts which pass over the sprocket wheels $27^a$, then downwardly and over the right hand sprocket wheel, $29^a$, and thence upwardly over the sprocket wheels $28^a$. From these sprocket wheels the said chain belts 30, 30, thence pass alternately downward and then upward again over the sprocket wheels $29^a$, $28^a$ through the several compartments of the oven. The right hand sprocket shaft 29 has its opposite ends supported in sliding bearings $29^b$, $29^b$ working in vertical openings or guides $29^c$, $29^c$ provided in the opposite side walls of the oven. Upon the outer side of each of said bearings $29^b$ is secured a cover plate $29^d$ which serves to maintain said vertical opening $29^c$ closed to prevent the escape of hot air or gases and the entrance of cold air into the oven as the bearing $29^b$ therein is caused to move up or down. The sprocket chains 30, 30 are maintained at the required degree of tautness by means of weights $29^e$, $29^e$, suspended from the outer ends of the bearings $29^b$, $29^b$.

31, 31 denote longitudinal buckets having ends which extend above the top edges of said buckets and are pivotally connected at their outer sides, adjacent to their upper edges to the chain belts 30, 30. The construction of said buckets 31, 31, is such as to cause the same to hang normally in a horizontal position during their passage through the oven. Each end of said buckets 31 is provided upon its outer lower edge directly below its supporting pivot with a stud $31^b$. In order to prevent undue tension upon any part of the chain belts 30, 30 the driving shaft 21, and certain of the shafts 27 may be provided at their forward ends with sprocket wheels $27^b$, $27^b$ and the same connected together by sprocket chain $27^c$, $27^c$ in order to more evenly distribute the strain.

At the left hand end of the oven (Fig. 1) is provided an inclined transverse chute 32 having a swinging door 33 to prevent the escape of hot air and gases from the oven, and the entrance of cold air into the same. The said chute 32 has its base $33^a$ extended outwardly and directly in front of its outer edge is arranged a roller 34 supported in brackets 35.

36 denotes an endless conveyer which serves to convey the material to be treated and to discharge the same into the chute 32. Upon the inner opposite side walls of the oven, and within the compartment 11 are arranged brackets 37, 37 to which are secured vertical guides $37^a$, $37^a$ formed of angle iron having their upper ends flared outwardly to provide an enlarged entrance end to receive the studs $31^b$, provided at the opposite ends of the buckets 31, in order to prevent the tilting of said buckets during the loading operation. Adjacent to the inner sides of the buckets 31, and opposite to the inner end of the chute 32 is arranged a vertical guard plate 38 which is secured at its opposite ends to the side walls of the oven, and upon the end wall of the oven directly below the chute 32, are secured two inclined deflecting plates 39, 40, arranged one above the other.

In the loading of the buckets as they pass in front of the mouth of the chute 32, the first particles that are discharged into the buckets are received upon that side of the bucket nearest to the outlet of the chute 32, and as the buckets descend the particles gradually fill across the bucket toward the opposite edge. At about this time the front edge of the succeeding bucket is beginning to receive the first of its charge. By this arrangement a fairly even, uniform loading of each bucket is insured and any particles tending to spill over the rear edge of the buckets are returned to the buckets by the guard plate 38. Any particles falling directly from the chute 32 are caught upon the deflecting plates 39, 40 and thereby guided into the buckets.

Adjacent to the left hand end of the oven, above the horizontal partition 15 is arranged a discharge hopper 41 having a forwardly inclined spout $41^a$ which projects through the rearward wall of the oven, and has its projecting end provided with a pivoted cover or door $41^b$. Near the end of the circuit, viz. adjacent to the opposite ends of said hopper 41 is arranged the means for discharging the buckets 31. The said means consists of a pair of semi-circular angle irons 42, 42 one of which is secured to each side wall of the oven in such position relatively to the hopper 41, and chain belts 30, 30 so that as the buckets 31 approach said hopper, the studs 31ᵇ on said buckets will engage the rounded portions of said angle irons 42, 42 and cause said buckets to tilt as they pass over said hopper, and thereby discharge their contents into the same.

To discharge the products of combustion, vapors, gases, etc., stacks 43, 44 and 45 are provided. The stacks 43 and 44 extend from the opposite sides of the oven while the stacks 45 extend from the top thereof. The said stacks are provided with dampers such as 44ᵃ, see Fig. 5.

In order to prevent undue heating of the bearings for the sprocket shafts 28, 29 the said shafts are carried through the side walls of the oven, and the bearings therefor mounted upon I-beams 46, 46 supported longitudinally of the oven upon masonry ledges 47, 47 provided upon the opposite side walls of the oven adjacent to the top and bottom thereof. As each oven compartment is provided with its own furnace different temperatures may be maintained simultaneously in said compartments. At the right hand end of the oven is arranged an opening 48, provided with a hinged door 49, to permit of access being had to the interior of the oven for the purposes of cleaning, repairing, etc.

The operation of the oven in general will be obvious from the foregoing description. It may be stated, however, that power is applied to the driving shaft 21 by means of the pulley 22, pinion 23, gear 24 on the shaft 25 having fixed thereon, the sprocket wheels 28ᵃ, 28ᵃ over which pass the connected chain belts 30, 30, and the latter thereby caused to rotate in the direction of the arrows Fig. 1. The material to be treated is fed into the chute 32 at the left hand end of the oven, by the endless conveyer 36 and discharged into the buckets 31, as they pass by the mouth of said chute. The buckets 31 are then caused to pass up and down several times through each of the oven compartments 12, 13, 14, and then horizontally through the passage above the horizontal partition 15, at the left hand end of which the studs 31 of the buckets 30 engage the tripping member and discharge the material into the discharge hopper 41 whence it passes through the spout 41ᵃ. For the purpose of baking coal briquets I may maintain the highest temperature within the compartment 12, a somewhat lower temperature in the compartment 13, and a still lower temperature in the compartment 14. For example I would maintain a temperature of 500° within the compartment 12, 300° within the compartment 13, and 250° within the compartment 14. The temperature in the passage above the horizontal partition 15 and also that within the compartment 11 may be the same as that of the outside atmosphere, or slightly above such temperature. In some instances, depending upon the purposes for which the oven is used, it may be desirable to maintain the lowest temperature within the compartment 12, and increase the same within the succeeding chambers.

It will of course be understood that the oven herein shown and described may be used for a variety of purposes, such as drying, annealing, heating or baking, and in which it may be desired either to increase or decrease the intensity of the heat from entrance to exit.

Having thus described my invention what I claim and desire to secure by Letters Patent is:—

1. An apparatus of the character described comprising an oven consisting of a plurality of separate compartments having outlets therein leading from one compartment to the next, means for separately heating said compartments, means for retarding the passage of heated fluid through said outlets, an endless conveyer extending through said compartments and said outlets therein, receptacles arranged upon said conveyer, means for loading said receptacles while in transit, means for maintaining said receptacles in position during said loading operation, and means for tilting said receptacles to discharge the contents thereof after passing through the oven, substantially as specified.

2. An apparatus of the character described comprising an oven consisting of a plurality of separate compartments having outlets therein leading from one compartment to the next, means for retarding the passage of heated fluid through said outlets, means for heating said compartments, an endless conveyer extending through said compartments and said outlets therein, buckets pivotally mounted upon said conveyer, means for loading said buckets while in transit, means for guiding said buckets during said loading operation, means for tilting said buckets to discharge the contents thereof after passing through the oven, and means for conducting the contents of said buckets from the oven, substantially as specified.

3. An apparatus of the character described comprising an oven consisting of a plurality of vertical compartments arranged side by side and provided with outlets at their upper ends, baffle plates arranged in said compartments and extending from the top thereof downwardly in front of said outlets, an endless conveyer arranged in said oven and extending vertically through said compartments and passing through the outlets therein, buckets pivotally mounted upon said conveyer, a chute for conducting the material into said buckets while in transit, means for maintaining said buckets in horizontal position during said loading operation, a guard plate arranged to the rear of said buckets adjacent to the end of said chute, means for maintaining said buckets in horizontal position during the loading operation, a series of inclined deflecting plates arranged below the chute, means arranged upon said bucket adapted to engage with coöperating means arranged within the oven to tilt said buckets to discharge the contents thereof, and a hopper for receiving contents of said bucket and discharging the same from the oven, substantially as specified.

4. An apparatus of the character described comprising an oven consisting of a plurality of vertical compartments having outlets at the top thereof and a longitudinal compartment arranged above certain of said vertical compartments, heating means arranged in each of said compartments, an endless conveyer arranged in said oven and extending through said vertical and horizontal compartments therein, transverse shafts mounted in said oven and extending through said compartments, sprocket wheels arranged upon said shafts, means for actuating said endless conveyer, buckets pivotally mounted upon said endless conveyer, a chute arranged at one end of said oven for delivering the material to be treated to said buckets, guides arranged adjacent to the discharge end of said chute for maintaining said bucket in horizontal position during the loading operation, means arranged adjacent to said chute coöperating therewith to load said buckets evenly, projections arranged upon each of said buckets, cam means arranged within said oven adapted to engage with the projections on said buckets to tilt the same, and a hopper arranged below said cam means and provided with a spout extending through the side of the furnace, substantially as specified.

5. An apparatus of the character described comprising an oven consisting of a plurality of separate vertical compartments having outlets at their tops, a horizontal compartment arranged above certain of said vertical compartments, baffle plates depending from the bottom of said horizontal compartments and extending downwardly in front of said outlets, furnaces arranged in the bases of said compartments, a plurality of horizontal rows of shafts arranged within said oven, sprocket wheels thereon; a plurality of said shafts and sprocket wheels being arranged in each compartment, an endless conveyer passing over said sprocket wheels, buckets pivotally mounted upon said conveyer, projections arranged at the opposite ends of said buckets, a chute for conducting material to be treated into said buckets, a pair of vertical guides arranged at the opposite sides of the furnace for receiving the supporting means and the projections on said buckets in order to maintain the same in horizontal position during the loading operation, a guard plate and deflecting plates coöperating with said chute to load said bucket evenly, semicircular plates arranged upon opposite sides of the oven above the loading chute adapted to engage the projections on said buckets to tilt the same, and a hopper having a restricted spout extending through the side of said oven for discharging the material from said oven, substantially as specified.

6. An apparatus of the character described comprising an oven consisting of a plurality of vertical communicating compartments, means for heating said compartments, a plurality of horizontal series of shafts arranged transversely of the oven and certain thereof extending through each of said compartments adjacent to their upper and lower ends, sprocket wheels arranged upon said shafts, a driving shaft, sprocket wheels thereon, a pair of sprocket chains extending in sinuous form over said sprocket wheels, buckets suspended at their opposite ends from said sprocket chains, and means for discharging said buckets comprising projections arranged at opposite ends thereof, and coöperating means arranged within said oven adapted to engage with said projections whereby to tilt said buckets, substantially as specified.

Signed at the city of New York, in the county and State of New York, this 6th day of December, nineteen hundred and twelve.

GEORGE J. MASHEK.

Witnesses:
 JOSEPH G. QUINN, Jr.,
 CONRAD A. DIETERICH.